US009352363B2

(12) United States Patent
Kirchhoff et al.

(10) Patent No.: US 9,352,363 B2
(45) Date of Patent: May 31, 2016

(54) DEVICE AND PROCESS FOR CLEANING PLASTIC CHIPS

(71) Applicant: KRONES AG, Neutraubling (DE)

(72) Inventors: Timm Kirchhoff, Westerholz (DE); Frank Rossen, Tarp (DE); Matthias Seul, Flensburg (DE)

(73) Assignee: KRONES AG, Neutraubling (DE)

( * ) Notice: Subject to any disclaimer, the term of this patent is extended or adjusted under 35 U.S.C. 154(b) by 658 days.

(21) Appl. No.: 13/710,394

(22) Filed: Dec. 10, 2012

(65) Prior Publication Data

US 2013/0146105 A1    Jun. 13, 2013

(30) Foreign Application Priority Data

Dec. 12, 2011    (DE) .......................... 10 2011 056 276

(51) Int. Cl.
| | |
|---|---|
| *B08B 3/00* | (2006.01) |
| *B08B 7/00* | (2006.01) |
| *B08B 3/10* | (2006.01) |
| *B29B 17/02* | (2006.01) |
| *B03B 5/02* | (2006.01) |
| B29K 105/06 | (2006.01) |
| B08B 3/04 | (2006.01) |
| B08B 3/08 | (2006.01) |

(52) U.S. Cl.
CPC ... *B08B 7/00* (2013.01); *B03B 5/02* (2013.01); *B08B 3/104* (2013.01); *B29B 17/02* (2013.01); *B08B 3/04* (2013.01); *B08B 3/08* (2013.01); *B29B 2017/0289* (2013.01); *B29K 2105/065* (2013.01); *Y02W 30/622* (2015.05)

(58) Field of Classification Search
CPC ...... B08B 2240/00; B08B 3/104; B08B 3/04; B08B 3/08; B29B 17/02; B29B 2017/0289; B03B 5/02; Y02W 30/622; B29K 2105/065
USPC .................................................... 134/137, 32
See application file for complete search history.

(56) References Cited

U.S. PATENT DOCUMENTS

| | | | |
|---|---|---|---|
| 8,394,866 | B2 | 3/2013 | Friedlaender et al. |
| 2002/0175123 | A1 | 11/2002 | Anderheggen et al. |
| 2009/0101169 | A1 | 4/2009 | Kirchhoff et al. |

(Continued)

FOREIGN PATENT DOCUMENTS

| | | |
|---|---|---|
| CN | 1087743 A | 6/1994 |
| CN | 101468350 A | 7/2009 |

(Continued)

OTHER PUBLICATIONS

Search Report of corresponding DE 10 2011 056 276.1, dated Jun. 26, 2012, 5 pages.

(Continued)

*Primary Examiner* — Eric Golightly
(74) *Attorney, Agent, or Firm* — Lewis Roca Rothgerber Christie LLP

(57) ABSTRACT

The present invention relates to a device (1) for cleaning plastic chips, comprising a container (2) for the reception of the plastic chips and a stirring device (4) which is rotatably arranged about a rotational axis (400) in the container for stirring the plastic chips, wherein the stirring device (4) has a rotational body (5) which extends along the rotational axis (400), wherein the rotational body (5) has a cross section having a varying distance (a) from the rotational axis (400).

12 Claims, 5 Drawing Sheets

(56) References Cited

U.S. PATENT DOCUMENTS

| | | | |
|---|---|---|---|
| 2009/0192235 A1 | 7/2009 | Friedlaender et al. | |
| 2010/0243004 A1 | 9/2010 | Smilow et al. | |

FOREIGN PATENT DOCUMENTS

| | | |
|---|---|---|
| DE | 1 032 719 | 6/1958 |
| DE | 24 37 564 | 2/1976 |
| DE | 40 18 780 A1 | 2/1992 |
| DE | 43 37 206 C1 | 3/1995 |
| DE | 195 14 543 C1 | 3/1996 |
| DE | 101 03 029 A1 | 7/2002 |
| DE | 10 2004 024 791 A1 | 12/2005 |
| DE | 10 2005 013 701 A1 | 9/2006 |
| EP | 0 805 011 A1 | 11/1997 |
| EP | 2 052 791 A2 | 4/2009 |
| FR | 350 813 A | 1/1905 |
| GB | 745457 | 2/1956 |
| JP | 56-118817 | 9/1981 |
| WO | WO 96/34729 | 11/1996 |
| WO | WO 00/76681 A1 | 12/2000 |

OTHER PUBLICATIONS

Extended European Search Report for parallel EP application EP 12 196 501, dated Mar. 25, 2013, 7 sheets.

Office action issue in the parallel Chinese patent application No. 201210495722, issued Aug. 27, 2014 (7 pages), and English translation (10 pages).

Section A-A

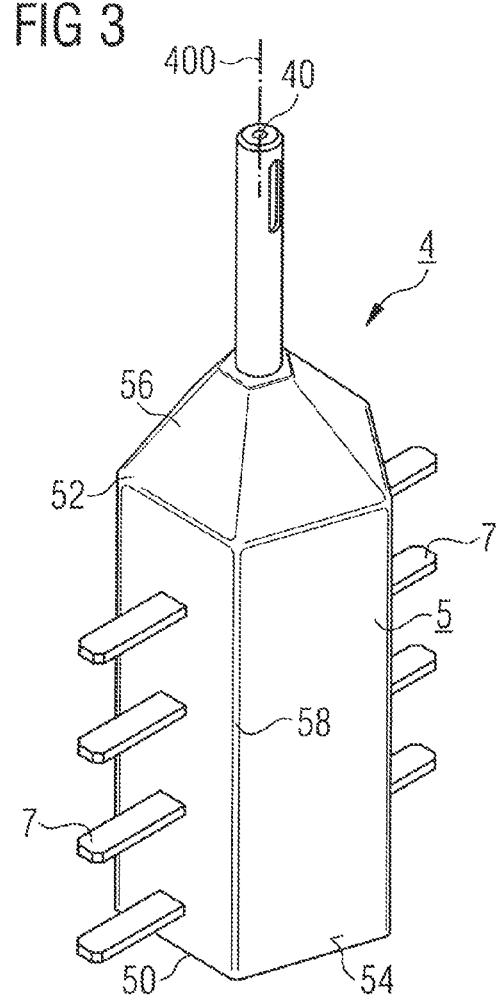
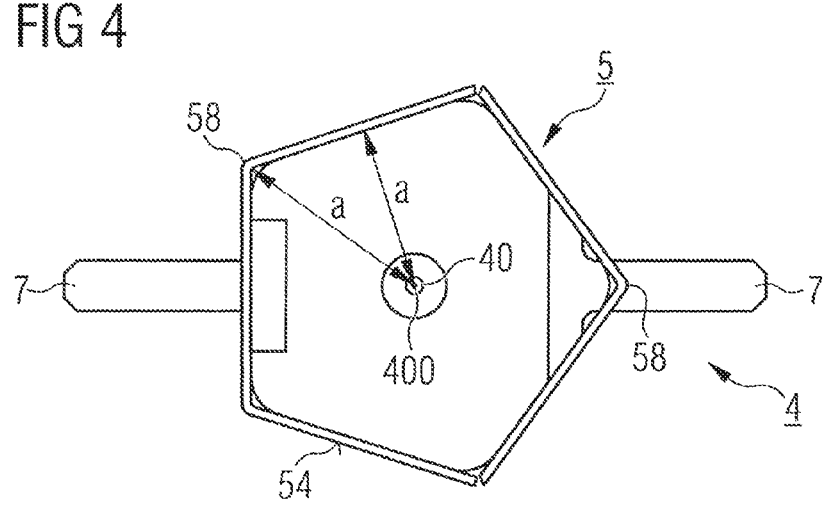

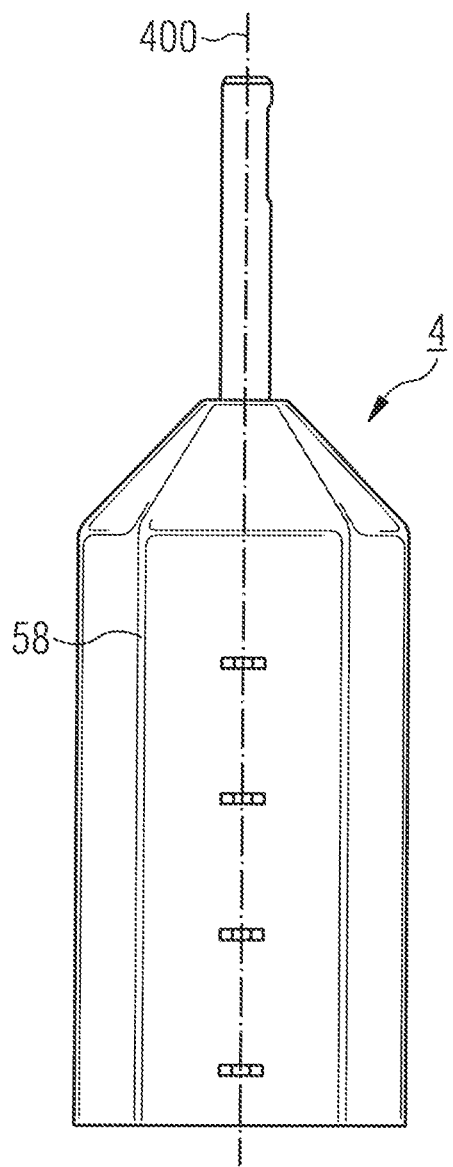

DEVICE AND PROCESS FOR CLEANING PLASTIC CHIPS

CROSS-REFERENCE TO RELATED APPLICATION

The subject application claims priority to and the benefit of German Patent Application Number 10 2011 056 276.1, filed on Dec. 12, 2011, the entire disclosure of which is incorporated herein by reference.

TECHNICAL FIELD

The present invention relates to a device as well a process for cleaning plastic chips, especially for cleaning impurity-loaded plastic flakes derived from the recycling of plastics, preferably recycling of plastic bottles and PET packaging materials.

PRIOR ART

In the field of recycling and re-using plastics, respectively, for example plastic bottles for bottling beverages and other plastic packaging materials for the food industry, it is known for the collected plastics to mechanically shred them in a suitable chip or shredding apparatus such that following this mechanical shredding plastic chips which are also referred to as plastic flakes will be provided. These plastic chips may be re-used for the manufacture of plastic articles and thus may appropriately be recycled.

Food grade plastics collected after withdrawal of plastic packaging materials from food applications have long been assumed not to be suitable any more for the re-use in the food sector due to impurities which were accumulated during use. Especially PET material derived from collected PET-package materials has been considered as not being suitable for the re-manufacture of plastic packaging material after recycling and instead reuse has rather been thought only to be possible on a lower level of product quality, i.e. not as food grade material.

Meanwhile however, recycling procedures have been proposed wherein impurities and contaminations of the respective plastic surfaces of the collected plastic packaging materials may be removed to such an extent that reuse of plastic materials will also be possible in the manufacture of new food grade plastic packaging materials. Especially the respective plastic material may also be used for the manufacture of plastic bottles for bottling beverages. Accordingly, this plastic material which was recycled is suitable for the re-use in the food sector.

In this context DE 10 2005 013 701 A1 for example discloses a process wherein the surface and the near-surface areas of collected PET material are able to be appropriately decontaminated so that re-use of this plastic material in the food sector will be possible. In this process cleaning of the plastic chips and plastic flakes, respectively, is of great importance before exposing them to the process disclosed in DE 10 2005 013 701 A1 since the surfaces of the initially impurity-loaded plastic chips must be purified from impurities and contaminations.

For impurities adsorbing to surfaces of the plastic material for example residual products from the respective plastic bottles as well as residual labels and adhesives are to be taken into account. It was found that for example plastic bottles will often be contaminated following initial utilization thereof by refilling them with other liquids which are different from the original product. Moreover for example plastic bottles are exposed to common contaminants because of improper storage and thus for example residual sand or soil might adhere to their surfaces.

These impurities are to be removed from the surfaces of the plastic material before and/or following grinding or shredding thereof to provide plastic material which is as clean as possible for reuse and for example for supplying to the process disclosed in DE 10 2005 013 701 A1 mentioned above.

The cleaning process of the plastic chips will thereby greatly be influenced by the following 4 factors: temperature of the cleaning process, mechanical treatment (abrasion and friction or attrition, respectively), concentration of a cleaning fluid (alkaline or acid solution or another fluid having purifying activity), as well as retention time in the respective cleaning device.

These four parameters will influence each other so that, consequently, to accomplish consistent cleaning performance retention time may for example be reduced while simultaneously temperature will be increased, whereas for example reducing alkaline concentration will increase the extent of mechanical cleaning etc. The mechanical component results in friction or attrition, respectively, either of the plastic chips among each other, and/or friction and attrition, respectively, of the plastic chips on the surfaces of the respective device, especially on the surfaces of a stirring device and/or on the surfaces of a container.

Good cleaning of the plastic chips, for example even from synthetically manufactured adhesives which are often hard to remove, especially the so called hot melt adhesives, or glues which are manufactured from natural resources which are used for attaching the labels to the external side of the plastic packaging material, for example PET bottles, may appropriately be accomplished only by way of an optimized setting of these four parameters.

In this context DE 43 37 206 C1 discloses a process for cleaning impurity-loaded plastic chips, wherein the retention time of the plastic chips within the separator and the washing apparatus herein will be extended by dividing the respective liquid bath at least into two partial baths separated from each other.

In WO 00/76681 A1 a device for washing plastic material is mentioned, wherein herein also the retention time of the respective plastic material charges is controlled within a stirring container.

EP 2 052 791 A2 proposes a device for cleaning bulk material wherein for example plastic flakes which are produced in recycling processes of PET bottles are cleaned in a wet cleaning process. Additionally mechanical cleaning will be realized by friction between the flakes as well as friction of the flakes at the respective housing parts.

DISCLOSURE OF THE INVENTION

Starting from this prior art it is an object of the present invention to further improve the cleaning efficiency of a device for cleaning plastic chips. This object will be accomplished by way of a device having the features of claim 1. Advantageous embodiments will be given in the dependent claims.

Accordingly, the device for cleaning plastic chips comprises a container for the reception of the plastic chips and a stirring device which is rotatably arranged about a rotational axis in the container for the stirring of the plastic chips, wherein the stirring device has a rotational body which extends along the rotational axis. According to the present invention the rotational body has a cross section perpendicular to the rotational axis whose distance from the rotational axis varies.

As the rotational body has a cross section whose distance varies perpendicularly to the rotational axis, with plastic chips, the distance which is present in a specified part of the container between the rotational body and the container wall is permanently being changed during rotation of the rotational body about the rotational axis, which results from permanent variation of the radius of the rotational body at a fixed position of the container. The plastic chips which are present between the rotational body and the container wall will accordingly be exposed to different ranges of pressurizing and depressurizing caused by distance variation, wherein the spatial arrangement thereof in the container will accordingly vary during time. In a preferred embodiment these ranges of pressurizing and depressurizing may periodically vary. Cleaning efficiency will be increased by these timely changing ranges of pressurizing and depressurizing since friction between plastic chips as well as between plastic chips and the respective surfaces of the device will be increased by the respective compression, and by variation of pressure friction may differently act on any individual plastic chip. Especially, due to variation of the normal force as a result of pressure variation transition from sticking friction to slide friction occurs in different ranges, so that plastic chips having all kinds of different impurities may be cleaned by abrasion. Accordingly improved mechanical cleaning efficiency of the plastic chips will be accomplished. Cleaning efficiency is predominantly effected by the friction of the plastic chips among each other. However, friction at the container wall and the rotational body herein must also to be taken into account.

Under varying distance of the cross section from the rotational axis it herein will be understood that the distance between the circumferential line of the cross section and the rotational axis varies along the circumferential line of the cross section. This would not apply to a circle which is concentrically arranged in relation to the rotational axis—in this case the distance between der circumferential line of the cross section and the rotational axis would be constant, i.e. the radius of the circle. Whereas the cross section having varying distance is formed such that, at least at one point, has a different distance. Typical examples for such a cross section are angular, polygonal, eccentric, cam style or oval cross sections, wherein distance variation between the rotational axis and the cross section, especially of the circumferential line of the cross section is obvious.

The device may be operable both in a wet process, for example by adding a cleaning liquid in the form of an alkaline solution, and in a wet process. In the dry mode of operation solely the friction generated between the plastic chips serves for cleaning off the plastic chips, wherein said cleaning off will further be promoted by the scrap which is produced in the process, which then will work as an abrasive agent. It is to be understood that the respective scrap, after completion of the process, must be able to be separated from the plastic chips before they can be fed to one of the subsequent process steps.

In a wet mode of operation utilization of the three other components, i.e. heat, time and alkaline concentration, may appropriately be reduced in relation to the previously known cleaning devices, since in the proposed device it is the mechanical component which is predominant. It is therefore allowed to perform the cleaning process in a more efficient and ecological manner since compared to the previously known approaches especially utilization of cleaning liquid and heat may be reduced.

Referring now to the friction it herein is defined that by frictional inhibition any movement is meant. Difference is made between external friction which arises between the interfaces of solid state material and internal friction which results from deformation of fluids and solid state materials.

External friction is also referred to as solid state friction as it exists between solid state interfaces. It will be classified into forced friction, sliding friction, rolling friction, drilling friction and rope friction. These frictional forms are not always strictly separated from each other as several frictional forms may be present simultaneously or alternately, for example the stick-slip effect is a periodic transition between sticking friction and sliding friction.

In the present device mainly sticking friction and sliding friction between individual plastic chips as well as between the plastic chips and the respective surfaces of the device will be considered. Sticking friction is generated by way of mechanical tottering between interfaces and molecular attraction forces (adhesion). Sliding friction is present at the interfaces between bodies approaching each other in a linear way.

It herein is to be noted, among others, that the frictional forces which exist between individual plastic chips in the device are markedly higher due to rotation of the rotational body and accordingly the permanently changing distance between the container wall and the rotational body, compared to the linear distances known in prior art between a stirrer and a container wall, such as for example upon using of a cylindrical profile of a stirrer. As the distance between container (wall) and rotational body (wall) in any segment of the containers permanently changes, transitions between sticking friction and sliding friction are permanently being created between den plastic chips, resulting in excellent cleaning efficiency due to the permanently changing normal force between the plastic chips.

By way of strong friction of the individual plastic chips it will be accomplished that adhered impurities, labels, residual adhesives as well as other contaminations will be removed from the respective plastic surfaces. Depending on process control part of the surface of the respective plastic chips will also be ablated so that surface-near contaminations which have penetrated the plastic material will abrasively be removed.

In one advantageous embodiment the cross section of the rotational body has at least one corner, preferably two, three, four, five, six, seven or more corners. More preferably provision is herein made for the cross section of the rotational body comprising a polygon, preferably a planar regular simple polygon, especially preferred a planar regular simple polygon having three, four, five, six, seven or more corners. By configuring the rotational body such that it has at least one corner it will be allowed to produce a rotational body in a simple mechanical manner, which has a cross section having varying distance between rotational axis and rotational body. The corners will further increase friction between the plastic chips and the rotational body, to thereby further increase the mechanical cleaning component. Furthermore the polygonal configuration promotes ease of manufacture as well elimination of undercuts, so that simple and easy cleaning of the device and excellent operational reliability may be accomplished.

In one aspect the rotational body is eccentrically arranged in relation to the rotational axis and its cross section preferably is circular, oval and/or cam type. Even this way allows generation of varying distance between the rotational axis and the rotational body leading to the periodic compression of the plastic chips in the container. The rounded configuration of the rotational body results in reduced wear of the machine components and consequently efficient apparatus design.

Preferably the cross section of the rotational body essentially remains constant along the rotational axis. In this way simple and easy configuration may be realized since elaborate shapes of the rotational body will be omitted. Accordingly the rotational body may for example be provided in the form of a prism having an appropriate base which corresponds to the cross section.

In order to avoid formation of deposits on the rotational body a conical intermediate area from the rotational body to the drive shaft of the stirring device may be provided, wherein this conical intermediate area may preferably be provided in an upper portion of the stirring device.

It will especially be preferred that even the container has a cross section having a distance varying from rotational axis. The cross section of the container may comprise at least one corner, preferably two, three, four, five, six, seven, eight or more corners. In one especially preferred embodiment the cross section of the container comprises at least one polygon, preferably a planar regular simple polygon, especially preferred a planar regular simple polygon having three, four, five, six, seven, eight or more corners. By configuring the container with a cross section which varies from the rotational axis it may be realized that the plastic chips do not undergo undesired movements in the container. Specifically it may be realized that not all of the plastic chips will circulate simultaneously with the rotational speed of the rotational body; instead a velocity gradient toward the container wall will rather be created. In this way time dependent fluctuating and preferably periodic compression of the plastic chips may efficiently be accomplished in a controlled manner.

In another advantageous embodiment the cross section of the container and the cross section of the rotational body comprise different numbers of corners, wherein the rotational body preferably has an odd number of corners and the container has an even number of corners, or the rotational body preferably has an even number of corners and the container has an odd number of corners. By having different numbers of corners of the rotational body and the container it may be accomplished that circulating compression or release, respectively, will be accomplished in the plastic chips. Especially it will be avoided that all corners or all surfaces of the respective polygons, respectively, will simultaneously reach the same distances between der container wall and the rotational body, which might lead to excessive vibrating of the complete apparatus, thereby dimensioning of the drive might become necessary. Whereas by the provision of the said different numbers on corners relatively uniform rotational operation of the facility will be accomplished, so that respective dimensioning of the drive for the rotational body may efficiently be performed.

In one more elaborate embodiment at least one crosspiece which is essentially perpendicular to the rotational axis of the stirring device is mounted on the stirring device which acts on the movement of the plastic chips within the container. The crosspiece is preferably mounted such that it is symmetrical in relation to the rotational axis and appropriately protrudes on opposite sides of the stirring device or from the rotational body respectively.

The rotational body of the stirring device preferably is formed such that it essentially has a constant cross section across the height of the container or the desired filling level of the container, respectively, i.e. the respective walls essentially are in parallel to the rotational axis.

The object which was set forth above will also be fulfilled by a process having the features of claim 12. Advantageous further embodiments will become obvious from the dependent claims.

Accordingly the process for cleaning plastic chips comprises introducing the plastic chips into a container, in which a stirring device which is rotatably arranged about a rotational axis for stirring the plastic chips is provided, the stirring device having a rotational body which extends along the rotational axis. According to the present invention by rotating the rotational body about the rotational axis a time-varying compression is applied to the plastic chips.

In this way improved mechanical cleaning performance may be accomplished.

BRIEF DESCRIPTION OF THE FIGURES

Preferred further embodiments and aspects of the present invention will be exemplified in detail by way of the following description of the figures, wherein:

FIG. 3 is a schematic perspective view of the stirring device;

FIG. 4 is a schematic sectional representation of the stirring device of FIG. 3;

FIG. 7 is another schematic lateral view of the stirring device, wherein this view is pivoted about 90 degrees in relation to the view shown in FIG. 6.

DETAILED DESCRIPTION OF PREFERRED EMBODIMENTS

Preferred embodiments will be described in the following on the basis of the figures. Here identical, similar, or equivalent elements are designated by identical reference numbers, and repeated descriptions of these elements are omitted in part in order to avoid redundancies in the description.

Figure 1:
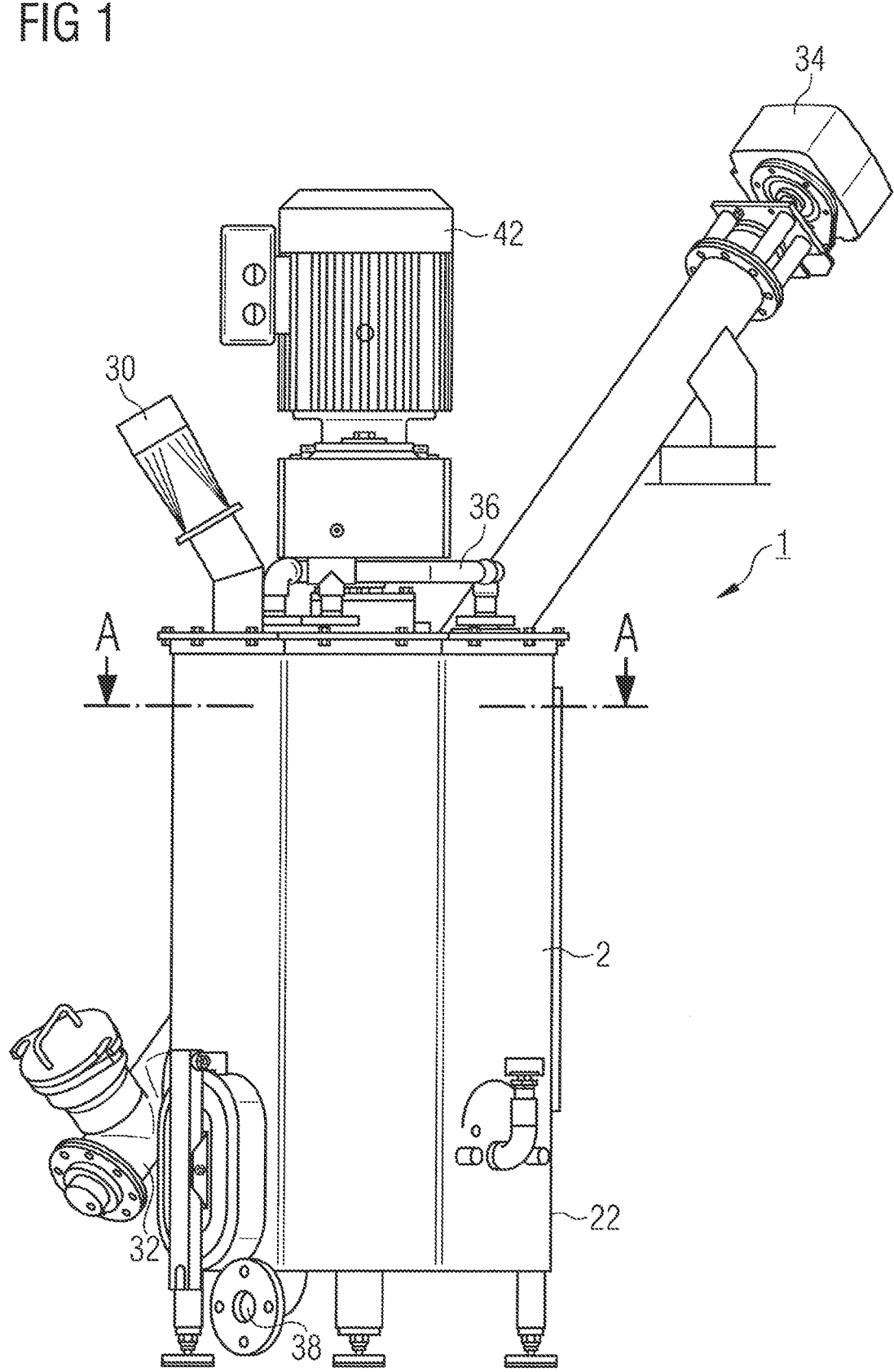
FIG. 1 is a schematic perspective lateral view of a device for cleaning plastic chips.

In FIG. 1 a device 1 for cleaning plastic chips is shown, wherein the device comprises a container 2 for the reception of plastic chips. The container 2 has a filling port 30 for introduction of the uncleaned plastic chips into the container 2, through which the plastic chips may be introduced at the top of the container 2. A discharge device 32 is provided at the bottom of the container 2 to allow withdrawal of the cleaned plastic chips from the container 2. The discharge device 32 usually has a feed screw conveyor which is driven by an appropriate drive motor 34.

As it already may be seen in FIG. 1 the container 2 is formed in a non-round manner but has an angular or polygonal cross section, respectively, including corners 22. In the embodiment shown in FIG. 1 the cross section is an equilateral octagon, i.e. an octagonal planar simple polygon.

Besides introduction of uncleaned plastic chips into the container 2 through filling port 30 a cleaning liquid, for example an alkaline solution having a percentage of 1.5 to 2% $OH^-$ ions may also be introduced into the container 2 through feed 36. The cleaning liquid may subsequently be withdrawn at the bottom of the container 2 through drain 38.

Figure 2:
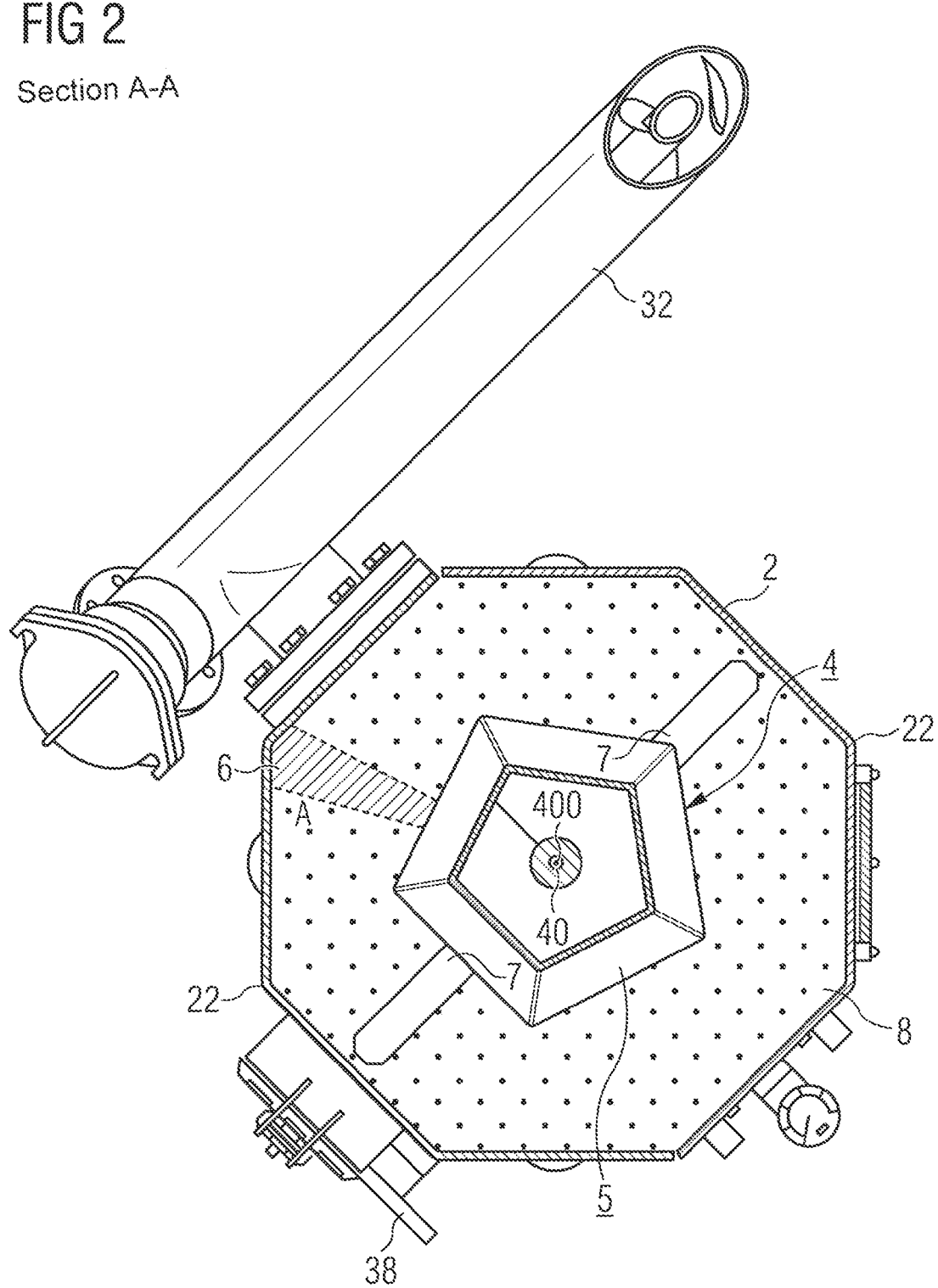
FIG. 2 is a schematic sectional representation of the device shown in FIG. 1 along the line A-A in FIG. 1.

In the container 2 which is shown in FIG. 2 in the cross sectional view along the cross sectional plane A-A of FIG. 1 a stirring device 4 is provided which rotatably is arranged about a rotational axis 400 in the container 2. The stirring device 4 is thereby driven and held by a rotational shaft 40 which is arranged in the center of the container and which in FIG. 2 simultaneously forms the rotational axis 400. The stirring device 4 is coupled to the drive motor 42 which generates the actual rotational movement via the rotational shaft 40 shown in FIG. 1.

The stirring device 4 comprises a rotational body 5 which is connected to the rotational shaft 40 in a rotatably fixed manner and which accordingly is also rotatably arranged about the rotational axis 400 in the container 2. As it is already obvious from FIG. 2 the rotational body 5 also has an angular cross section, especially the cross section of a regular pentagon, i.e. a planar regular simple polygon having five corners 58.

The stirring device 4 is still shown in FIG. 3 in a perspective schematic view. Starting from the rotational shaft 40 which is coupled to the motor 42 in FIG. 1, the rotational body 5 extends from its lower end 50 to its upper end 52 with an essentially constant cross section. In other word the respective wall surfaces 54 of the rotational body 5 are essentially arranged in parallel to the rotational axis 400 of stirring device 4. Thus, the rotational body 5 is a prism having a pentagon as a base.

The rotational body 5 extends between its lower end 50 and its upper end 52 essentially across that level of the container 2 up to which the plastic chips are to be introduced and treated, respectively. During regular operation the container 2 is accordingly filled with plastic chips up to about the upper end 52 of the rotational body 5.

Above the upper end 52 of the rotational body 5 an essentially conical intermediate region 56 is provided which is provided as a transition from the polygonal rotational body 5 to the rotational shaft 40. The conical configuration allows cleaning liquid and plastic chips to be able to drain or drip off, respectively, thereby eliminating formation of deposits on the rotational body 5.

The cross section of the rotational body 5 may for example also be seen in FIG. 4 wherein it is obvious that the respective wall areas 54 have an essentially parallel orientation in relation to the rotational axis 400. Additional it is apparent from FIG. 4 that the cross section of the rotational body 5 essentially is formed as a planar regular simple polygon having five corners 58 and the rotational body 5 is formed as a prism having a pentagon a base.

Furthermore it immediately will become apparent that the distance between the rotational axis 400 and the rotational body 5 varies. Especially, in the pentagon shown in FIG. 4 the distance a between the rotational axis 400 and a corner 58 of the pentagon is higher than between a central area of a wall surface 54 of the rotational body 5 and the rotational axis 400. Accordingly the distance varies across the cross section of the rotational body 5 and the circumferential line of the rotational body 5, respectively.

It can be seen in FIG. 2 that the container 2 is of octagon-shaped design and the rotational body 5 is of pentagon-shaped design. Accordingly they differ in the numbers of corners 22, 58 of the rotational body 5 and the container 2. The rotational body 5 has an odd number of corners 58 and the container 2 has an even number of corners 22.

From these different numbers of corners it will result, as it may for example seen in FIG. 2 that in a specific viewed segment 6 which in FIG. 2 is exemplified in cross-hatched pattern the distance A between the rotational body 5 and the container 2 is permanently varying as soon as the rotational body 5 starts rotating about the rotational axis 400. By way of this oscillating distance A between der surface of the rotational body 5 and the wall of the container 2 a periodically varying pressure will be applied to the respective plastic chips which are present in this viewed segment 6. Accordingly the plastic chips are periodically compressed and released in this viewed segment 6 thereby creating a marked increase in friction of the plastic chips among each other. It is understood that this view analogously applies to any other segment of the volume of the container 2.

Furthermore crossbars 7 are attached to the stirring device 4 extending perpendicularly to the rotational axis 400 and protruding beyond the rotational body 5, so that they extent into the container 2.

As it is for example shown in FIG. 3 the crossbars 7 are preferably arranged superimposed to each in a line of multiple crossbars 7 in parallel to each other, wherein the crossbars are located at sides of the rotational body 5 which each are adjacent to each other. By way of the crossbars 7 the plastic chips will be brought in a circulating movement such that high friction between individual plastic chips as well as between the plastic chips and den respective surfaces of the stirring device 4 and the container 2, respectively, will also be produced in this manner. In this way a circulating flow of the plastic chips in the container 2 will result which however due to the geometry of the container 2 and the respective geometry of the rotational body 5 is exposed to periodical compression.

Due to its odd number of corners the rotational body 5 is configured such that the crossbars 7 if they extent at exactly opposite ends of the rotational body 5, protrude differently far beyond the rotational body 5, although they each have identical radii in relation to the rotational axis 400. This is due to the fact that, as for example it may be seen from FIG. 4, a crossbar 7 exits the rotational body 5 from a planar wall side 54 and the exactly opposite crossbar 7 exits the rotational body 5 from a respective corner 58 of the rotational body 5. Even in such manner increase in compression and release, and thus marked increase in friction of the plastic chips within the container 2, respectively, will be produced.

Figure 5:
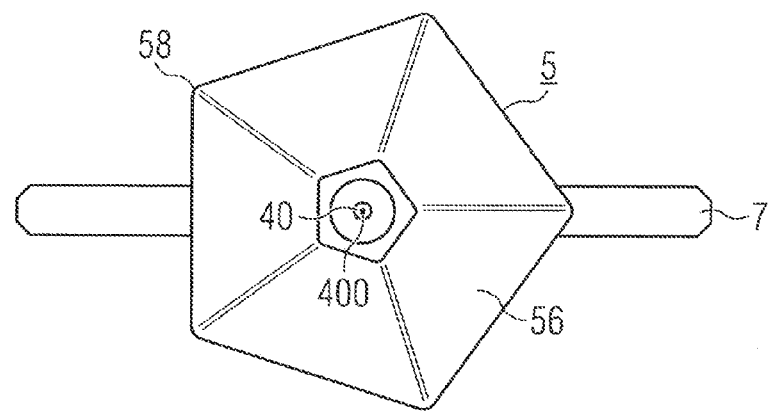
FIG. 5 is a schematic perspective plan view of the stirring device along the rotational axis.

FIG. 5 schematically shows a planar view of the conically tapered areas 56 of the rotational body 5. Herein it may be seen that the respective conically tapered surfaces are beveled such that plastic chips and liquids, respectively, may not be retained in the rotational body 5.

Figure 6:
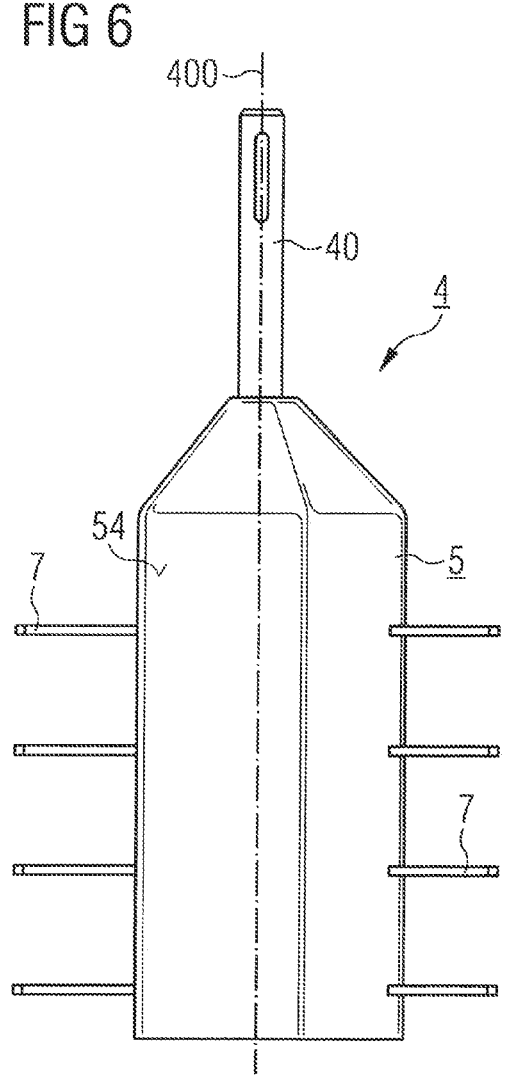
FIG. 6 is a schematic lateral view of the stirring device.

In the FIGS. 6 and 7 the stirring device 4 is shown in another two lateral views wherein the views are pivoted against each other by 90 degree. Therefrom, especially in FIG. 4, the asymmetrical configuration of the rotational body 5, depending on the position, will become apparent.

From FIG. 2 it will become apparent that at the bottom of the device 1 a discharge bottom 8 is provided, said discharge bottom 8 being configured in the form of a screen, a perforated plate, of another permeable means, such that for example the cleaning liquid which is used for cleaning the plastic chips may be drawn to the bottom. In this way separation of cleaned plastic chips and cleaning liquid from suspended matter entrained therein occurs.

Even with dry cleaning in the dry operational mode it is advantageous to draw the dusts to the bottom by way of an air flow.

At the discharge bottom 8 in turn the plastic chips will be conveyed to the discharge screw 32.

Herein continuous operation of the device is enabled especially by introducing plastic chips from the top via filling port 30 onto the plastic chips which are already present in the container 2, and the retention time in the cleaning device will be accomplished by regulating the discharge volume of the discharge device 32, as shown in FIG. 1. An individual plastic chip will thereby pass through a virtually helical path from the top of the container 2 to the discharge screw 32, thereby enabling setting of the retention time in the device 1.

In the cleaning device 1 as shown in the figures appropriate oscillation onto the respective plastic chips within the container 2 will be generated by the rotational body 5 having varying cross section.

The container 2 is not necessarily required to also have an angular structure but may as well be round shaped, whereas in this case upon circulating a velocity gradient of the plastic chips will be set by friction of the plastic chips on the wall of the container 2, such that a periodical pressure wave will pass the individual plastic chips and permanent circulation will be accomplished as well. However, the configuration of an angular container 2 is advantageous at least in that undesired movements of the plastic chips may be avoided and appropriate process control will become possible.

It has also been taken into account to equally form the numbers of the corners 22, 58 of the container 2 as well as of the rotational body 5, wherein in this case cleaning efficiency might suitably be influenced by the application of increased apparatus vibration.

All individual characteristics which are represented in the individual embodiments may be combined with each other and/or may be replaced, while still falling within the scope of the invention.

The invention claimed is:

1. A device for cleaning plastic chips, the device comprising a container for the reception of the plastic chips and a stirring device which is rotatably arranged about a rotational axis in the container for stirring the plastic chips, wherein the stirring device has a rotational body which extends along the rotational axis, wherein the rotational body has a cross section perpendicular to the rotational axis whose distance thereof from the rotational axis varies, and wherein the container has a cross section perpendicular to the rotational axis, whose distance to the rotational axis varies.

2. The device according to claim 1, wherein the cross section of the rotational body has between one corner and eight corners.

3. The device according to claim 1, wherein the cross section of the rotational body comprises a polygon.

4. The device according to claim 1, wherein the cross section of the rotational body along the rotational axis is essentially constant.

5. The device according to claim 1, wherein an essentially conical intermediate region that extends from the rotational body to a drive shaft of the stirring device is provided in an upper region of the stirring device.

6. The device according to claim 1, wherein the cross section of the container has one or more corners.

7. The device according to claim 1, wherein the cross section of the container comprises at least one polygon.

8. The device according to claim 6, wherein the cross section of the container and the cross section of the rotational body have a different number of corners.

9. The device according to claim 1, wherein at least one crossbar for conveying the plastic chips extends from the rotational body into the container.

10. The device according to claim 3, wherein the cross section of the rotational body comprises a planar, regular, simple polygon having three or more corners.

11. The device according to claim 7, wherein the cross section of the container comprises at least one planar, regular, simple polygon having three or more corners.

12. The device according to claim 8, wherein the rotational body has an odd number of corners and the container has an even number of corners, or wherein the rotational body has an even number of corners and the container has an odd number of corners.

* * * * *